Sept. 16, 1924.  
F. H. FUNCHESS  
1,508,929  
PISTON RING  
Filed Sept. 27, 1921
Fig. 1.
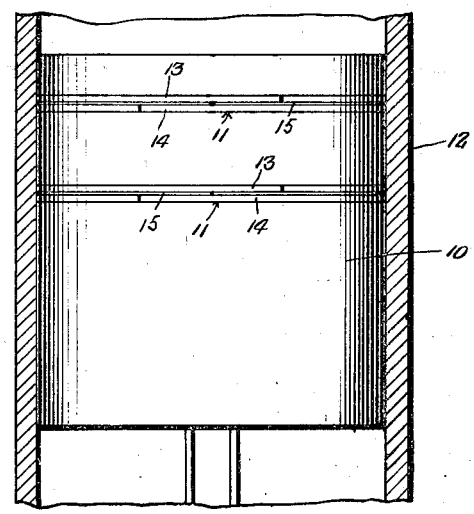
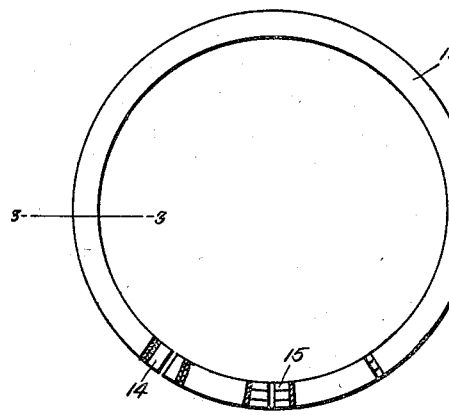
Fig. 2.
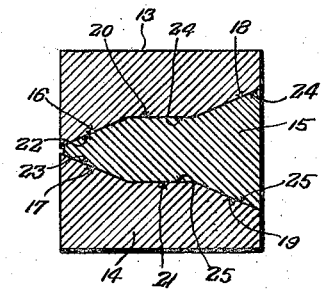
Fig. 3.
F. H. Funchess, INVENTOR.
BY Geo. P. Kimmel, ATTORNEY.

Patented Sept. 16, 1924.

1,508,929

UNITED STATES PATENT OFFICE.

FRED H. FUNCHESS, OF HANFORD, CALIFORNIA, ASSIGNOR TO SUPER SEAL PISTON RING COMPANY, OF HANFORD, CALIFORNIA, A CORPORATION OF CALIFORNIA.

PISTON RING.

Application filed September 27, 1921. Serial No. 503,610.

*To all whom it may concern:*

Be it known that I, FRED H. FUNCHESS, a citizen of the United States, residing at Hanford, in the county of Kings and State of California, have invented certain new and useful Improvements in Piston Rings, of which the following is a specification.

This invention relates to packing devices, more particularly to the packing for pistons of various kinds, and has for one of its objects to improve the construction and increase the efficiency and utility of devices of this character.

With these and other objects in view the invention consists in certain novel features of construction as hereinafter shown and described and then specifically pointed out in the claims, and in the drawing illustrative of the preferred embodiment of the invention:—

Figure 1 is a side elevation of a conventional piston with the improved packing rings applied, and located in a portion of a cylinder, the latter being in section.

Figure 2 is a plan view, partly in section of one of the improved packing rings.

Figure 3 is an enlarged cross section on the line 3—3 of Figure 2.

The body of the piston is represented as a whole at 10 and provided with the usual annular seats indicated at 11 to receive the packing rings.

A portion of the cylinder is represented at 12.

The improved packing is formed in three sections, coacting divided ring sections 13 and 14 and an intermediate divided spreader ring section 15 located between the coacting outer ring sections.

For the purpose of this description the face of the packing next to the cylinder 12 is referred to as the outer portion or the part contacting with the inner face of the cylinder, and the part toward the interior of the cylinder as the inner portion.

The confronting faces of the sections 13 and 14 toward the cylinder are reversely bevelled as indicated at 16 and 17, while the confronting faces of the sections 13 and 14 toward the interior of the cylinder are likewise reversely bevelled as indicated at 18 and 19.

The intermediate portions of the confronting faces of the members 13 and 14 are directed in parallel relation as indicated at 20 and 21.

The opposite faces of the portion of the member 15 toward the inner face of the cylinder 12 are reversely bevelled as indicated at 22 and 23 to conform to and closely engage the faces 16 and 17 of the members 13 and 14, while the opposite faces of the portion of the member 15 toward the interior of the cylinder are reversely bevelled to conform to and closely engage the faces 18 and 19 of the members 13 and 14 as indicated at 24 and 25.

The opposite faces of the intermediate portion of the member 15 are directed in parallel relation to conform to and initially engage the parallel portions 20 and 21 of the members 13 and 14.

The portions of the ring members 13 and 14 next to the cylinder where the greater strains or wear occurs are the heavier to effectually resist such wear and strain, and automatically take up the wear by the coaction of the parts.

The divisions or "splits" between the ends of the several members will be so located that no two come in alinement longitudinally of the cylinder and piston, as will be obvious.

By this construction and arrangement of parts it will be noted that the three parts 13, 14 and 15 of the ring are equal in area, transversely, hence possess equal strength and wear resisting quality, and also possess equal spring tension and exert equal expansive force.

The coaction of the bevelled faces 18, 24 and 19, 25, hold the back part of the ring against the ring groove or channel, thus eliminating any tendency to rock on the ring seat.

Another advantage of the improved construction is that in event of even a very slight irregularity in the inner face of the piston, for instance a very slight taper even to the thousandth of an inch, the wear is taken up by the central member 15 which expands the outer portions 13 and 14 uniformly and prevents unevenness developing between the walls of the groove or channel.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention what is claimed as new is:—

1. A packing comprising a pair of outer resilient split rings and an intermediate split resilient ring interposed between said outer rings, the body portion of said intermediate ring diverging from its outer edge to a point adjacent one side of the center of said body portion and further converging from its inner edge to a point adjacent the other side of the center of said body portion, and the body portion of each outer ring having its inner face formed with a pair of spaced bevelled surfaces, one extending inwardly from the outer edge and the other inwardly from the inner edge of said body portion, one of the bevelled surfaces of each of the outer rings riding against the diverging portion of the inner ring and the other bevelled surface of each of the outer rings riding against the converging portion of the inner ring.

2. A packing comprising a pair of outer and an intermediate split resilient ring interposed between said outer rings, each outer ring having its inner face formed with a pair of spaced bevelled surfaces extending in parallel planes in transverse section at any point throughout and further provided with a substantially wide centrally disposed plane surface separating the bevelled surfaces and extending throughout in a plane parallel to the outer face of said ring, and said intermediate ring having its inner and its outer face each formed with a pair of spaced bevelled surfaces extending in parallel planes in transverse section at any point throughout, and each face further provided with a substantially wide centrally disposed plane surface separating a pair of bevelled surfaces and extending in a plane parallel to the outer face of each outer ring, the outer edge of said inner section being of materially less width than the inner edge thereof.

3. A packing comprising a pair of outer and an intermediate split resilient ring interposed between said outer rings, each outer ring having its inner face formed with a pair of spaced bevelled surfaces extending in parallel planes in transverse section at any point throughout, and said intermediate ring having its inner and its outer face each formed with a pair of spaced bevelled surfaces extending in parallel planes in transverse section at any point throughout, one of the bevelled surfaces on each of said faces of the intermediate ring extending from the outer edge of the ring and the other of the bevelled surfaces on each of said faces of the intermediate ring extending from a point inwardly of and terminating at the inner edge of said ring.

In testimony whereof I affix my signature hereto.

FRED H. FUNCHESS.